US009143558B2

(12) United States Patent
Blander et al.

(10) Patent No.: US 9,143,558 B2
(45) Date of Patent: Sep. 22, 2015

(54) GEOGRAPHIC RESILIENCY AND LOAD BALANCING FOR SIP APPLICATION SERVICES

(75) Inventors: Emanuel Blander, Noridiya (IL); Amir Peles, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 1515 days.

(21) Appl. No.: 11/746,630

(22) Filed: May 9, 2007

(65) Prior Publication Data

US 2008/0282254 A1 Nov. 13, 2008

(51) Int. Cl.
*H04L 29/08* (2006.01)
*G06F 15/173* (2006.01)
*H04L 29/06* (2006.01)
*H04L 29/14* (2006.01)

(52) U.S. Cl.
CPC ........ *H04L 67/1021* (2013.01); *H04L 65/1006* (2013.01); *H04L 67/1002* (2013.01); *H04L 67/1029* (2013.01); *H04L 65/1063* (2013.01); *H04L 67/1027* (2013.01); *H04L 67/1034* (2013.01); *H04L 69/40* (2013.01)

(58) Field of Classification Search
CPC .................. H04L 67/1029; H04L 67/1034
See application file for complete search history.

(56) References Cited

U.S. PATENT DOCUMENTS

| 7,496,651 | B1* | 2/2009 | Joshi | 709/223 |
| 2003/0126263 | A1* | 7/2003 | Fenton et al. | 709/226 |
| 2003/0195984 | A1* | 10/2003 | Zisapel et al. | 709/238 |
| 2006/0013147 | A1* | 1/2006 | Terpstra et al. | 370/252 |
| 2006/0112170 | A1* | 5/2006 | Sirkin | 709/217 |
| 2007/0104198 | A1* | 5/2007 | Kalluri et al. | 370/392 |
| 2008/0183991 | A1* | 7/2008 | Cosmadopoulos et al. | 711/162 |
| 2008/0280623 | A1* | 11/2008 | Danne et al. | 455/453 |

OTHER PUBLICATIONS

J. Rosenberg, "SIP: Session Initiation Protocol", Jun. 2002, http://tools.ietf.org/html/rfc3261, pp. 1-269.*

* cited by examiner

*Primary Examiner* — Suraj Joshi
(74) *Attorney, Agent, or Firm* — M&B IP Analysts, LLC

(57) ABSTRACT

A mechanism for achieving resiliency and load balancing for SIP application services and, in particular, in geographic distributed sites. A method performs a distribution of SIP requests among SIP servers, where at least two sites with a load balancer in each site is configured. The method includes receiving a SIP request by a first load balancer in a first site; determining whether the SIP request should be redirected to a second site; and redirecting the SIP request to an address of a second load balancer in the second site. The invention also includes a SIP proxy including a receiving unit receiving SIP requests; a load balancing unit distributing SIP requests between SIP entities; and a health monitoring unit verifying availability of the SIP entities. The SIP proxy may further be configured with a proximity measuring unit determining a proximity to a SIP entity.

32 Claims, 5 Drawing Sheets

GEOGRAPHIC RESILIENCY AND LOAD BALANCING FOR SIP APPLICATION SERVICES

BACKGROUND OF THE INVENTION

1. Field of the Invention

The present invention relates to a session initiation protocol (SIP) application service, and more particularly to a method and system for providing redundant load balancers for the SIP application service; a mechanism for distributing SIP requests/dialogues to SIP proxies and servers based on optimization factors including load, availability, cost and proximity of one or both dialogue endpoints; and a mechanism for redirecting SIP requests/dialogues to a peer load balancer when it is determined that a server under the peer's control is most optimally suited to handle the dialogue. As SIP load balancers inherently act as SIP proxies, the mechanism for redundant load balancers can be applied to other types of SIP proxies (i.e. to provide globally redundant SIP proxies).

2. Description of Related Art

The rapid evolution of voice and data technology is significantly changing the business environment. The introduction of services such as instant messaging, integrated voice and email, and follow me services has contributed to a work environment where employees can communicate much more efficiently, thus increasing productivity. To meet the demands of the changing business environment businesses are deploying converged voice-and-data networks based on a SIP application service.

As businesses continue to increase their use and reliance on converged services, reliability and availability becomes increasingly important. High availability and optimized solutions for IP networks address the need for users to be able to place and receive calls under peak-load call rates or during device maintenance or failure. In addition to lost productivity, network downtime often results in lost revenue, customer dissatisfaction, and even a weakened market position. Various situations can take devices off line, ranging from planned downtime for maintenance to catastrophic failure.

Today, high availability and optimized solutions for a SIP application service is usually achieved by distributing the service across multiple servers and using a load balancer to distribute SIP requests amongst the servers. The load balancer insures that requests pertaining to the same session/dialogue are persistently distributed to the same server (if this is a requirement and it usually is). In order to insure true SIP load balancing, it is usually required that the load balancer act as a SIP proxy (usually stateless), which is typically a call-control device that provides many services such as routing of SIP messages between SIP user agents. This is particularly true when load balancing SIP over TCP/TLS, since TCP splitting and/or multiplexing are usually required. In addition, the load balancer monitors the health, load, and availability of each of the servers. When a server fails or its availability is least optimal (relative to other servers), the load balancer stops distributing requests to that server.

For redundancy a second load balancing device is usually deployed on the same network and serves as a backup to the active load balancer, often incorporating Virtual Router Redundancy Protocol (VRRP) and a synchronizing mechanism. The load balancers themselves (active and backup) are always deployed on the same geographical site. The servers may be deployed on the same geographical site, or alternatively, on some deployments the load balancer (and its backup) and the servers may deployed on separate geographic sites. The servers themselves may also be deployed on several separate sites. Thus, if a site containing a group of servers fails, other servers deployed on the other sites remain available. However, the fact that both load balancers are deployed on the same geographic site leaves the system susceptible to complete site failure (e.g. natural disaster, geographic power shortage, etc.).

In addition to geographic distribution of the servers, the prior art proposes another solution involving deploying load balancers on two or more sites. Each load balancer is assigned a unique VIP (Virtual IP addresses) through which the SIP application service is invoked. Each SIP client is aware of each of the VIPs, with one configured as the active VIP to which it directs SIP requests. The other VIPs are configured as backups.

In addition, each SIP client monitors the active VIP (i.e. the active load balancer), and if it detects that the active load balancer fails, it directs its SIP requests to the backup. If SIP over TCP is used, for example, a load balancer can be detected as failed when one or more TCP connections to that VIP fail. When the formerly active load balancer returns (again detected by the client), SIP requests can again be directed to the active VIP.

However, this solution is most limited as it requires each SIP client to monitor the load balancers and to be configured with backup VIPs for each service. Furthermore, the client must be aware that when the active load balancer returns, requests pertaining to existing sessions must continue to be directed to the backup. Most often, the client is either unknown in advance or is non-configurable to this behavior making this solution highly unfeasible.

Another problem with the prior art is, even when some of the servers are deployed on separate geographical sites, the distribution algorithms of the load balancers do not take the site locations into consideration, ignoring the fact that proximity of the servers to one or both of the call endpoints can contribute to the effective availability of the SIP service, including latency and QOS. This is of particular importance for voice applications, which comprise a large part of all SIP based applications.

Geographic load balancing mechanisms used for HTTP and other web applications cannot be applied to SIP applications without major limitations. Although SIP is an HTTP like request-response protocol, there are certain fundamental differences that make the problem unique. This is due largely to the peer to peer and asynchronous nature of the SIP protocol, the fact that SIP requests traverse multiple application level nodes limiting redirection capabilities mid path, the higher QOS requirements of voice applications and SIP servers can use TCP, UDP and SCTP transports.

Thus in typically prior art solutions, if a site containing a group of servers fails, other servers deployed on the other sites remain available, however, this does not address failure of the site on which the load balancers (active and local backup) are deployed. Furthermore the prior art does not optimize the load balance distribution algorithm by taking into account SIP server proximity to one or both of the session/dialogue endpoints. It would be advantageous to geographical distribute SIP load balancers and account for SIP server proximity to one or both of the session/dialogue endpoints.

Whatever the precise merits, features, and advantages of the prior art is, none of them achieves or fulfills the purposes or advantages of the present invention.

SUMMARY OF THE INVENTION

The present invention provides a new mechanism for achieving resiliency and load balancing for SIP application services and in particular in geographic distributed sites. The invention includes a method for performing a distribution of SIP requests among SIP servers, where at least two sites with a load balancer in each site is configured. The method includes receiving a SIP request by a first load balancer in a first site; determining whether the SIP request should be redirected to a second site; and redirecting the SIP request to an address of a second load balancer in the second site.

The invention also includes a SIP proxy. The SIP proxy includes a receiving unit receiving SIP requests; a load balancing unit distributing SIP requests between SIP entities; and a health monitoring unit verifying availability of the SIP entities. The SIP proxy may further be configured with a proximity measuring unit determining a proximity to a SIP entity. Proximity may be related a start point, for example the SIP proxy a server, a load balancer or a geographical site, all towards an end point being, for example, a calling party of a SIP transaction or a called party of a SIP transaction.

The invention also includes a computer readable medium embodying a software program when executed on a processor controlling a SIP service. The processor causing the receiving a SIP request by a first load balancer in a first site; determining whether the SIP request should be redirected to a second site; and redirecting the SIP request to an address of a second load balancer in the second site.

The general term "address" (of a site or a load balancer) may be, for example, an IP address related to a site or a load balancer, or a domain name that relates to the site or load balancer.

These and other aspects, features and advantages of the present invention will become apparent from the following description of non-limiting exemplary embodiments, which is to be read in connection with the accompanying drawings.

DETAILED DESCRIPTION

Figure 1:
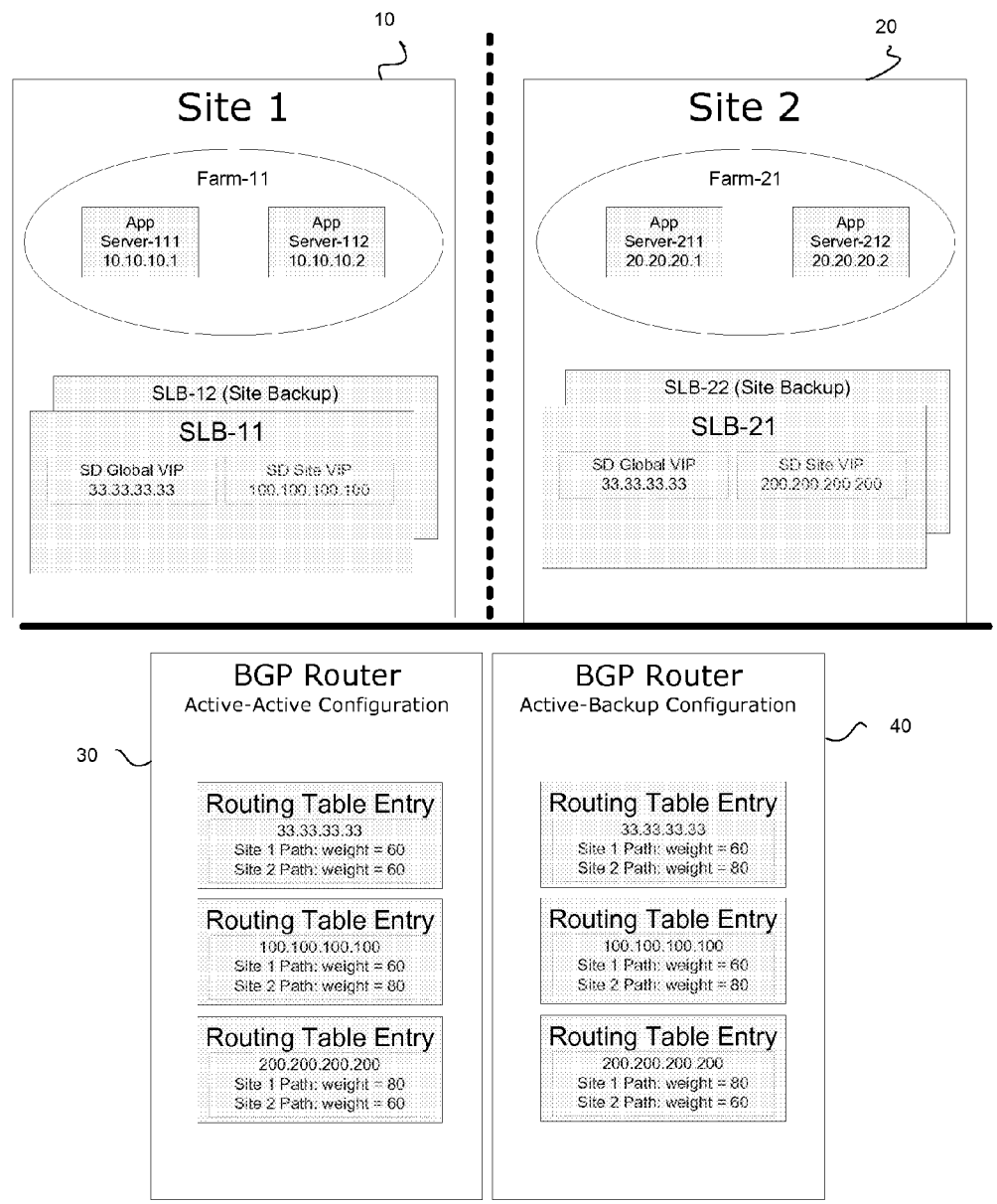
FIG. 1: an example of a globally distributed SIP application system of the present invention.

FIG. 1 shows an exemplary embodiment of the present invention where two load balancer sets (primary and backup) are deployed on two separate geographical sites and implementing geographic redundancy for a SIP application service. Site 1 (10) shows a first set of load balancers SLB-11 and SLB-12, where SLB-12 serves as the site 1 (10) backup. Site 2 (20) shows a second set of load balancers SLB-21 and SLB-22, where SLB-22 serves as the site 2 (20) backup. Thus each site has an active and a backup load balancer. In addition, in this exemplary embodiment, one load balancer set at one site serves as the active load balancer set and the other site is its geographic backup. For example, the load balancers SLB-21 and SLB-22 at site 2, may serve as the geographic backup to the load balancers SLB-11 and SLB-12 at site 1.

The local backup load balancer will be activated if a failure occurs to the active load balancing device at a particular site. For example, if, at site 1, SLB-11 failed then SLB-12 would be activated. In the event of total site failure, then the geographic backup will be activated. For example, if site 1 failed then site 2 would be activated. This model can be expanded to multiple site deployments and is not limited by the number of geographic backup sites. In addition, instead of an active-backup deployment, sites can be deployed as an active-active where both sites are active with each balancing and backing-up the other. Furthermore, any combination of the above may be deployed to provide a combination of active-backup and active-active deployments.

Turning to an active-backup configuration, the SIP service(s) is assigned a Global Virtual IP (VIP). This VIP is an Anycast IP address. Anycast is a network addressing and routing scheme whereby data is routed to the "nearest" or "best" destination as viewed by the routing topology. An Anycast IP address may be defined on multiple machines located on separate local networks. Each machine publishes the address, together with a cost or priority, to the routing topology. Each load balancer is configured to load balance requests that are directed to this Anycast IP address.

As shown in FIG. 1, the SLB-11 includes the Global VIP "SD Global VIP" 33.33.33.33. The active load balancer SLB-11 publishes this anycast address with a lower cost than the backup site, for example see FIG. 1, BGP Router Active-Backup Configuration (40) weight in the Routing Table Entry for 33.33.33.33 where the backup Site 2 is published with a higher weight that Site 1. Thus, so long as the active load balancer is online, all requests directed to this VIP will be directed by the network toward the active load balancer SLB-11. This VIP shall be called the Global VIP (of the service). The Anycast method may use any routing protocol like BGP, RIP or OSPF to announce the VIP to the network.

In addition, each site load balancer is configured with a second unique VIP that is associated with the SIP service/Global VIP. Each such VIP shall be called a Site VIP. Thus, three VIPs are defined for the service: one Global VIP, and two Site VIPs (one for each site). As seen in FIG. 1, Site 1 includes SLB-11 and site 2 includes SLB-21 both having the Global VIP 33.33.33.33. In addition, as shown in FIG. 1, the SLB-11 includes the Site VIP "SD Site VIP" 100.100.100.100 and the SLB-21 includes the Site VIP "SD Site VIP" 200.200.200.200.

The Site VIPs are also Anycast addresses and both Site VIPs are supported by each site. As shown in FIG. 1, each site load balancer publishes its own Site VIP with a low cost and all other "peer" Site VIPs with a higher cost. See BGP Router (40) Routing Table Entry. Furthermore, on each site load balancer, the "peer" Site VIP is also associated with the Global VIP and the corresponding SIP service. Thus, on both sites, requests directed to the Global VIP, the Site VIP, or the Peer Site VIP will all be load balanced amongst the site SIP servers (i.e., servers under the authority of the site load balancer).

As stated, the Global VIP and each Site VIP are Anycast addresses. An alternative to using Anycast addresses would be to use domain names. For example, instead of each site defining the Anycast Global VIP, each site would define a unique global VIP that is a normal IP address. A single domain name, called the Global Domain Name, would be defined in a DNS server to resolve to both sites' Global VIPs, either with equal priority, or with one site having a higher priority than the other. Such a DNS server can be each of the load balancers themselves, that will receive DNS queries and resolve them to a selected VIP.

Similarly, instead of each Site VIP being defined as an Anycast address, each Site VIP can be defined as a normal IP address, with each Site VIP assigned its own Site Domain Name, that resolves to its Site VIP. In the DNS, peer site VIPs can be added to the Site Domain Names record with lower priorities than the own site's Site VIP.

Throughout the remainder of this document, the term Global VIP shall refer to the Global VIP or the Global Domain Name. Likewise, the term Site VIP shall refer to the Site VIP or Site Domain Name. The only difference would be that, during site failure, instead of the networking routing to the remaining site due to lack of publicizing by the fallen site, the client will detect that the fallen site has fallen (e.g. via TCP failure detection) and route to the remaining site based on the information provided by the DNS server.

Similarly, the general term "address" (of a site or a load balancer) may be either an IP address related to a site or a load balancer, or a domain name that relates to the site or load balancer.

The initial request of a dialogue is always directed to the Global VIP. This is the IP that is publicly associated with the service, either by convention or via DNS resolution. Since the load balancer acts as a SIP proxy, it will add itself to the VIA path. In addition, the load balancer will add itself into future route paths by inserting itself into the record-route list. In a preferred embodiment the address of the Site VIP, not the Global VIP, is added to both the VIA and Record-Route headers by the handling load balancer. This insures that future requests (and their responses) will continue to arrive at the same geographic load balancer so long as the load balancer is online, and will minimize requests of the same dialogue jumping between sites.

This is particularly important for dialogues that were initiated at the backup site (for example after the active site failed). It insures that even if the active site returns, the dialogue will continue to be handled by the backup site. Since the Site VIP is also defined on the peer site (with a higher cost), should the initial handling site fail, the call will continue to be handled by the peer site. Even though requests of the dialogue "jump" to the peer site mid dialogue, this may be preferred to losing dialogues completely. If such "jumping" is not desired, the load balancers can be configured not to handle requests which it did not handle initially or only the Global VIP will be assigned an Anycast address. Similarly, the load balancer can be configured to reply with an SIP error response message to such requests. Alternatively, the Site VIPs can be configured as normal, not Anycast, IP addresses. Such requests will not jump but rather will fail to be forwarded by the network.

The above described features can be applied to other types of SIP proxies that require geographic resiliency, not just a load balancing SIP proxy.

Proximity/Load Based Geographic Load Balancing

In another embodiment comprising an active-active configuration, FIG. 1 shows an example of a BGP Router (30) with routing tables supporting an equal cost (weight) and implementing geographic load balancing. In this configuration, each load balancer will usually publish the Global VIP with an equal cost. This results in initial dialogue requests being distributed between each of the two sites, Site 1 (10) and Site 2 (20). Each load balancer can either handle the initial request by itself, by forwarding to a server under its authority or redirect the request to the peer load balancer at the other site, where the peer load balancer will forward the request to a server under the peer load balancer's authority.

Another embodiment in the active-active configuration may be implemented where the Global VIP is still published at a lower cost at one of the sites. Requests will arrive at the second site only if redirected from the first site (not shown in FIG. 1).

The mechanism used to redirect initial requests between sites is described below using examples where algorithms determine whether a request should be redirected to the peer site SLB. Each load balancer maintains the current load/availability of each of the servers under its authority. Similarly, each load balancer maintains a cache that contains the "proximity" between that load balancer and a SIP endpoint. Proximity may also be related to any SIP proxy, a server, Load Balancer or a Geographical site, all towards the calling party of a SIP transaction or the called party of a SIP transaction. Proximity is measured in either terms of IP response time, SIP application response time, the number of SIP hops (i.e. proxies) that separate between the load balancer and the endpoint, the number of IP hops that separate between the load balancer and the endpoint or a combination of each of these. Examples of how each of these is calculated are described below. Each site's load balancer shares its aggregated load/availability and proximity information (for the SIP service) with each of its peer load balancers. This is often achieved using a protocol to supply periodic updates, however any method for synchronizing this information may achieve the same result.

When defining the SIP service in each of the load balancers, the user can specify that the load balancing amongst the servers be based on a combination of the relative load/availability (i.e. forward to the server with the lowest load) and/or proximity of the load balancer (and thus its managed servers) to the sending and/or receiving endpoint of the request (i.e. forward via a server that is "closest" to the sender and/or receiver). The weight of each of these factors is configurable, for example the importance of proximity compared to the server load/availability. The load/availability component described above and below may be based on a combination of parameters. These include parameters like server availability, call admission control, least cost, and time dependant decisions such as time-of-day, day-of-week, etc.

Availability of a server can be achieved by having the load balancer's load/availability component perform health monitoring of each of the servers under its control. The load balancer monitors the health of each of it servers by periodically performing a health check. This may be a simple connectivity check like ping, or an application level health check achieved by having the load balancer issue a SIP request (e.g. INVITE, OPTIONS, REGISTER, etc.) to the server over UDP, TCP, SCTP, or TLS. The load balancer validates the server health by verifying that the response of the server includes a valid response code (e.g. 200 OK) and/or verifying that the response includes or doesn't include a certain character string.

When a request (for example a new dialogue) is received by the load balancer, the relative load/availability of each of its servers is examined and the proximity between the load balancer and each of the dialogue endpoints is calculated. Similarly, based on the information received from the peer load balancer, the load/availability of the peer site's servers and the proximity of the peer site to the dialogue's endpoints is calculated. If the specified combination of load/availability and proximity is lowest for a peer site server, the request is redirected. As shall be shown below, in an example embodiment, if the initial request is redirected, subsequent requests shall be directed directly to the peer site.

Proximity Determination

Proximity to an endpoint can be determined as follows. When a request of a new dialogue arrives, the domains of the "From" and "To" URI-s (Uniform Resource Identifiers) of the request are noted. If proximity information, for the domain of the endpoints, appears in a cache then it is used. Otherwise, it is calculated in the following manner.

To determine the number of SIP hops, a dummy UDP SIP message like INVITE (with a dummy user name as the target) will be sent to the domain name/IP address of the endpoint.

The response may be an error response (since a dummy INVITE is used), yet will still contain a VIA list. For example, if jon@cnn.com issues a SIP request to david@fox.com, proximity to the sender will be determined by sending an INVITE to XXdummyXX@cnn.com and proximity to the receiver will be determined by sending an INVITE to XXdummyXX@fox.com.

The number of SIP hops will be calculated as the number of VIAs in the response before the VIA of the desired domain (fox or CNN). It is worth noting that the SIP server of fox.com or cnn.com may continue to forward the request (to internal proxies of the domain), and therefore will appear in the middle of the VIA list.

The response time will simply be measured as the time elapsed from the time the dummy SIP request is issued until the response is received. As stated above, the proximity measurement will be a combination of the hop and response time values (as specified by the user).

The number of IP hops can be determined by sending a UDP request having a starting TTL value to a client at a sufficiently high port number as to elicit an "ICMP port unreachable" reply message The request as it was received by the endpoint will appear in the response, including the TTL at the time of reception. The TTL as it appears in the error response is subtracted from the staring TTL. This represents the number of IP hops The IP response time can be determined by sending an "ICMP Echo request" to an endpoint and calculating the time elapsed until the receipt of an "ICMP Echo reply". Other methods of sending network packets to the endpoint, that trigger the endpoint to send back network packets may be used just as well.

Request Redirection

When a load balancer determines, based on the load/availability of the servers and the proximity of the load balancer to the sender and/or receiver of the initial request, that the request and subsequent dialogue should be redirected to a peer load balancer (as described above), it redirects the request as follows.

The redirecting load balancer acts as an intermediate SIP proxy and forwards the SIP request, to the peer load balancer. When forwarding over TCP or TLS an existing or new connection between the redirecting load balancer and the peer load balancer's Site VIP may be used to transport the forwarded SIP message. When forwarding over UDP, the message will be transported in a UDP packet whose destination IP is set to the peer load balancer's Site VIP, and the source VIP is set to any valid IP address of the redirecting load balancer. The SIP message itself is modified as follows.

In order to remain on the path for the response, the redirecting load balancer adds itself to the VIA path. This is required since usually (especially in SIP over TCP) only the redirecting load balancer can relay the response(s) back to the client, since it is the one who has terminated the request connection of the client.

The redirecting load balancer will not add itself to the record-route list. This insures that subsequent dialogue requests will not be routed through the redirecting server. When adding itself to the VIA list, the redirecting load balancer will add a parameter to the VIA that indicates that it is performing redirection. This will indicate to the peer load balancer that global redirection has already been performed and therefore no further global redirection should be initiated (thus preventing redirection loops). The request is then forwarded to the Site VIP of the peer load balancer (that has been associated with the global/Site VIP) over the same transport over which the request was received.

When the peer load balancer receives the forwarded initial request at its Site VIP, it will note that the request has been redirected and therefore will load balance the request amongst the servers under its authority (i.e. it won't redirect the request further). This prevents redirection loops between sites. Since the peer load balancer also acts as a SIP proxy, it will also add itself to the VIA path. In addition, it will add its Site VIP to the record-route list. This insures that all subsequent dialogue requests will be routed towards its Site VIP. Subsequent dialogue requests arriving at the Site VIP will be routed consistently to the same server since server persistency is maintained per dialogue.

When handling an initial dialogue request (via its global VIP interface) that is not redirected to a peer load balancer (but rather is forwarded to a server under its authority), the load balancer adds its own Site VIP to the record-route list, insuring that all subsequent dialogue requests will be routed through it. Subsequent requests arriving at the Site VIP of the load balancer are routed based on the server persistency that is maintained per dialogue.

Since redirection occurs as one SIP proxy forwarding to another, it will be forwarded over a TCP, TLS, SCTP or logical UDP connection between the two proxies. The transport between the two load balancers carrying the request will usually be the same as transport over which the request arrived at the original load balancer.

If a transport change is desired as part of the redirection process, then the redirecting load balancer must remain on the path throughout the duration of the dialogue. In this circumstance, the redirecting load balancer will add its Site VIP in the record route.

A SIP Application

An example deployment of a globally distributed SIP application is now described based upon FIG. 1. In the example illustrated by FIG. 1 a distributed global application called "MyApp" is distributed amongst two farms/clusters. Each cluster resides on a separate geographical site being Site 1 (10) and Site 2 (20). Site 1 (10) includes Farm-11 having two application servers 111 and 112. Site 2 (20) includes Farm-21 also with two application servers 211 and 212.

Each application instance (on both sites) is configured with the same application domain name and global VIP. The specified domain name and/or global VIP are used to reference the application.

As described above, a Sip Load Balancer (SLB) instance is used to manage a local site's farms. Furthermore, each site contains a second SLB device that serves as a backup to the working SLB of a site. Thus, each site contains 2 SLB devices for example Site 1 (10) includes SLB-11 and SLB-12.

In this example, the global system can work in one of two modes: active-active or active-backup. When working active-active, new dialogue requests are distributed between the two sites, with each site serving as a backup to the other. If a whole site fails or disconnects, all traffic is handled by the second site. When the first site recovers, it again begins handling new calls, while existing calls are handled by the second site.

When working active-backup, all new dialogue requests are handled in the active site. If the connectivity to the site fails, all traffic is handled by the second site. When the first site recovers, it returns to handling all new calls. However existing calls that were initiated while the active site was down will continue to be handled by the second site.

With reference to FIG. 1, the Global VIP is used by external entities to initiate dialogues directed to the application. Similarly, if a domain name is used, it resolves to the global VIP.

Each SLB will define a Global VIP interface. This IP address is an anycast address. When the two sites are working as an active-active configuration, each SLB publishes (via BGP/OSPF/RIP) its VIP with an equal weight. Thus, requests directed to the global VIP are distributed amongst the two different sites, that is the active SLB at each site. When an SLB fails (a site failure), all requests directed to the global VIP will be routed to the non-failed SLB.

When working active-backup, the active site SLB publishes (via BGP/OSPF/RIP) its Global VIP with a lower weight. Thus, requests directed to the Global VIP are forwarded to the active site SLB. When the active site SLB fails, all requests will be routed to the backup site SLB.

SIP transactions are routed to a specific SLB via the Site VIP of the application at each site. A unique Site VIP is defined for each site for each global VIP. This VIP is used in the following two circumstances:

Target of a route header that is the result of the inserting of a Record-Route during session initiation. This is used to maintain call persistency within the site.

Redirection from one site to another (as part of the global load balancing mechanism).

Each Site VIP will also be defined as an anycast address. This will allow the backup site to handle requests/responses that are directed by the network to the Site VIP if the original site fails. In this case, the SLB that owns the Site VIP will always publish a cost that is lower (i.e. greater importance) than the peer site (which will handle requests to the peer's Site VIP only if the peer fails).

Figure 2:
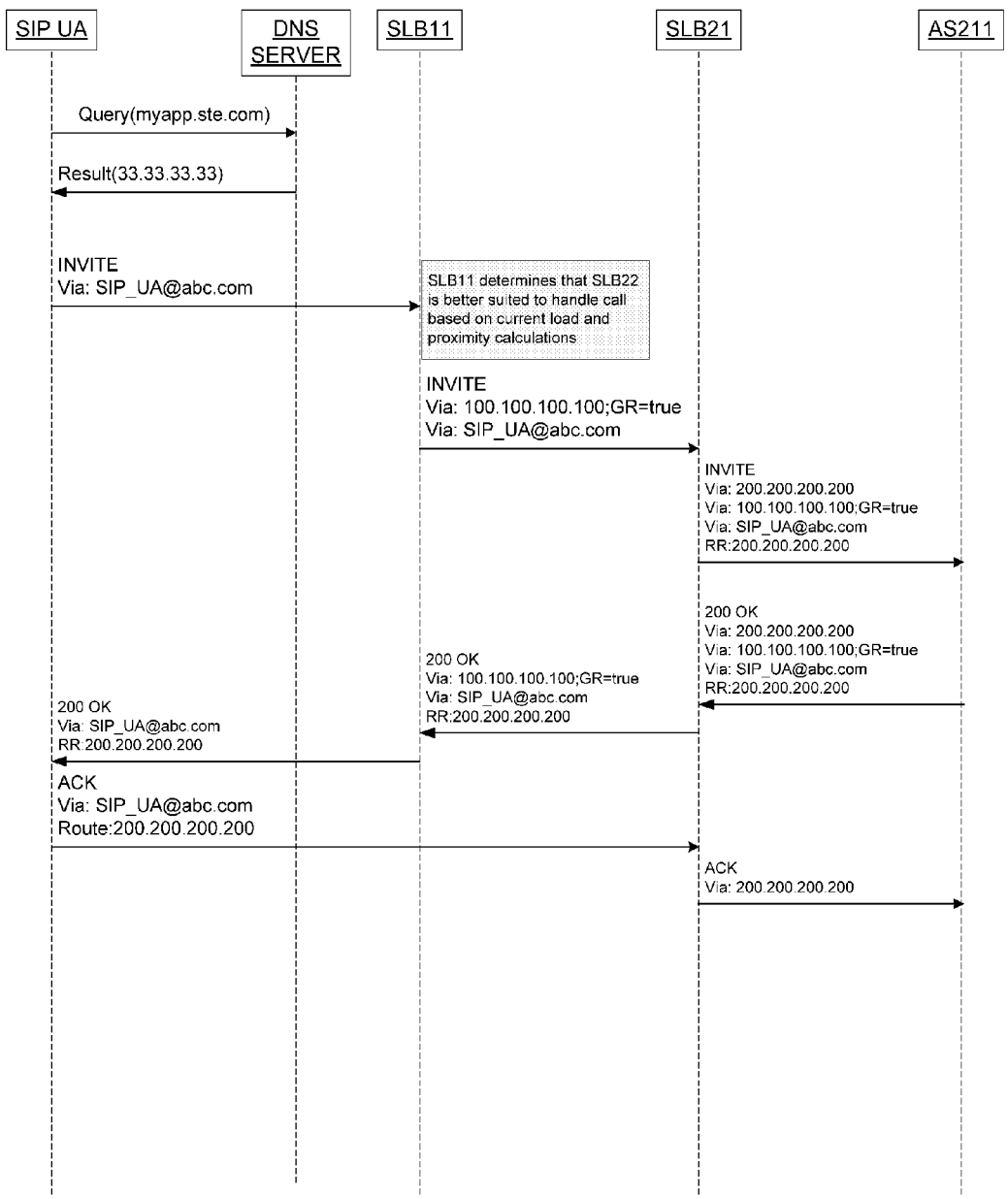
FIG. 2: shows an example of global load balancing.

FIG. 2 shows an example of global load balancing and is based on the setup in FIG. 1, and assumes an active-active configuration. The scenario begins when a SIP client or proxy issues a DNS request for myapp.site.com. This DNS request will be resolved to the Global VIP 33.33.33.33. Similarly, the client can issue the request directly to the Global VIP, if it is known by the client.

The SIP request is then sent by the client to the Global VIP. As shown in FIG. 2 the client SIP UA sends an INVITE to SLB-11. At this point, the handling SLB (here SLB-11) will make a load balancing decision based on the availability (i.e. server availability, call admission control, least cost, or any of the other availability algorithm) of all servers (both local and peer site) and the proximity of the sender ("from") and/or receiver ("to") to both itself and the peer site. This is based on an analysis of the load/availability of the local servers, proximity to the "from" and/or "to" domains (appearing in its cache or being recalculated), and similar information received from the peer SLB.

In this scenario of FIG. 2 it is determined that the site best suited to handle the request is the peer site (because the best server is under the authority of the peer SLB), and the request is forwarded to the peer load balancer using the procedures described above. As shown in FIG. 2 the SLB-11 forwards the INVITE to SLB-21 adding itself into the VIA list.

The peer load balancer, SLB-21, notes the globally redirected parameter (GR) in the VIA header, and then forwards the INVITE to the best suited local application server (adding a VIA and a record route that contain its Site VIP). In FIG. 2 SLB-21 forwards the INVITE to server AS 211. The response is sent to the client in the reverse path.

Future requests of this call contain a Route header containing the peer Site VIP and are routed by the routing infrastructure to the Site VIP of the peer SLB. As shown in FIG. 2 the client SIP UA responds with an ACK with a route header containing the Site 2 VIP 200.200.200.200.

Figure 3:
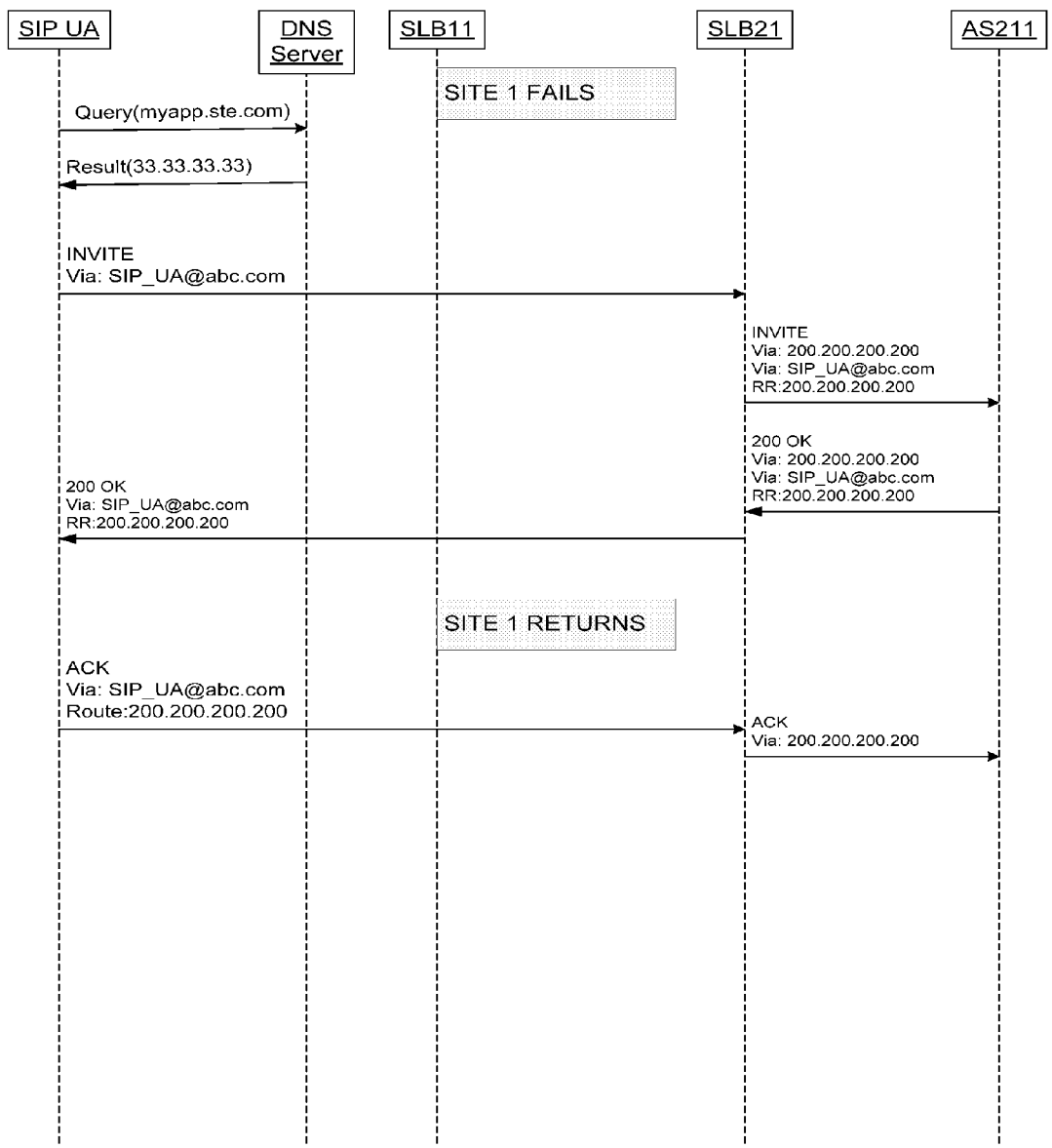
FIG. 3: shows an example of a site failure with a new dialogue scenario.

FIG. 3 shows an example of a site failure with a new dialogue (after the site failure) scenario and is based on the setup in FIG. 1, and assumes an active-backup configuration. When the SLBs of Site 1 fail, all requests to the Global VIP are directed by the routing infrastructure to the SLB of Site 2. This is because the Global VIP is an anycast address. When Site 1 fails, its SLB stops publishing weights for the Global VIP, and the routing infrastructure routes packets directed to the Global VIP to Site 2.

As shown in FIG. 3, the INVITE from a client SIP UA is sent to SLB-21. SLB21 adds a Record-Route header containing 200.200.200.200, the Site VIP to the forwarded SIP message.

When Site 1 comes back on line, the routing infrastructure begins to direct new dialogue SIP requests to the Global VIP to Site 1. However, all dialogues that were handled by Site 2, including all those initiated when Site 1 was down, will continue to be handled by Site 2, since Site 2's SLB inserted a Record-Route header with the Site 2 VIP during dialogue initiation. Site 2 will continue to route requests of the same dialogue to the same server due to the server persistency it maintains per dialogue.

Figure 4:
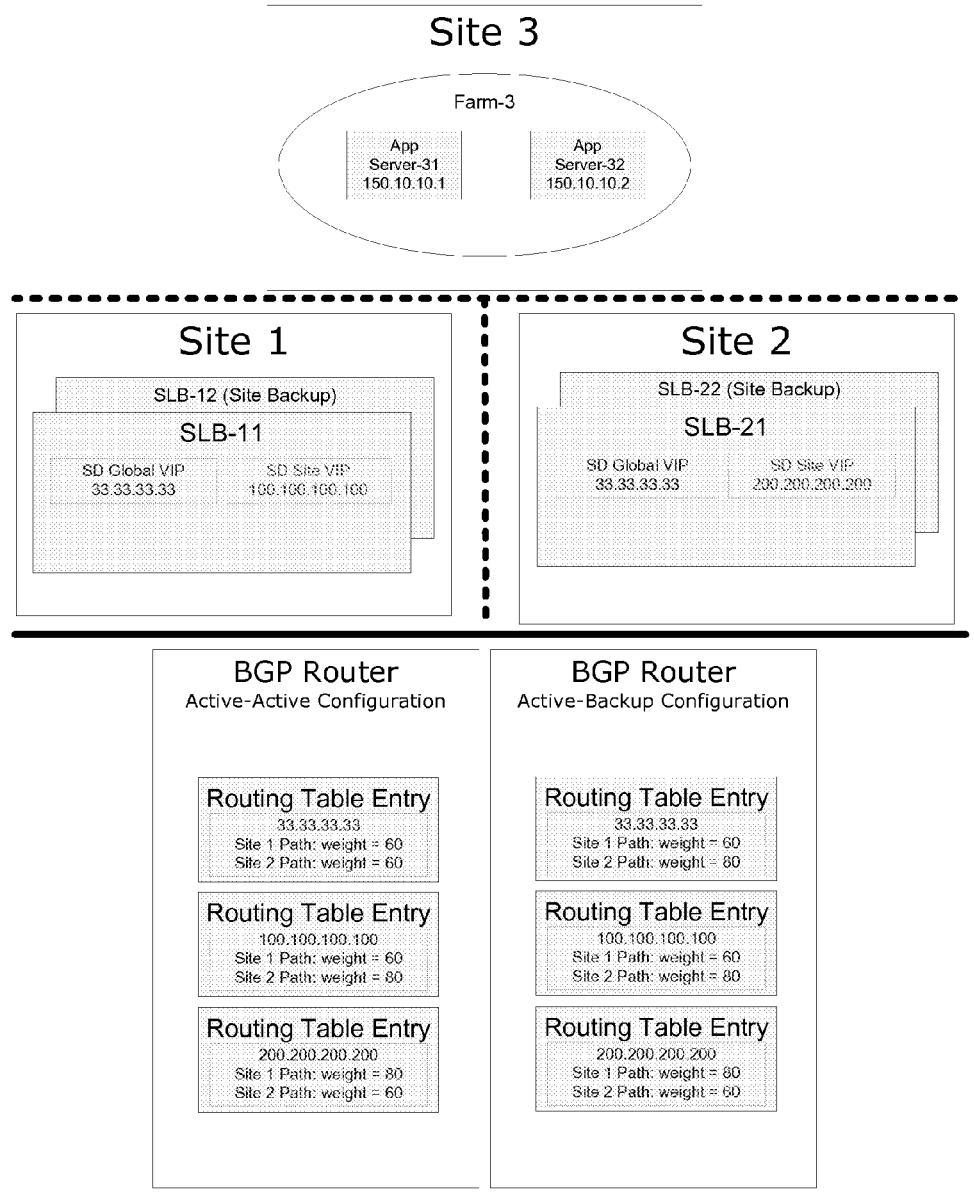
FIG. 4: another example of a globally distributed SIP application system of the present invention.
Figure 5:
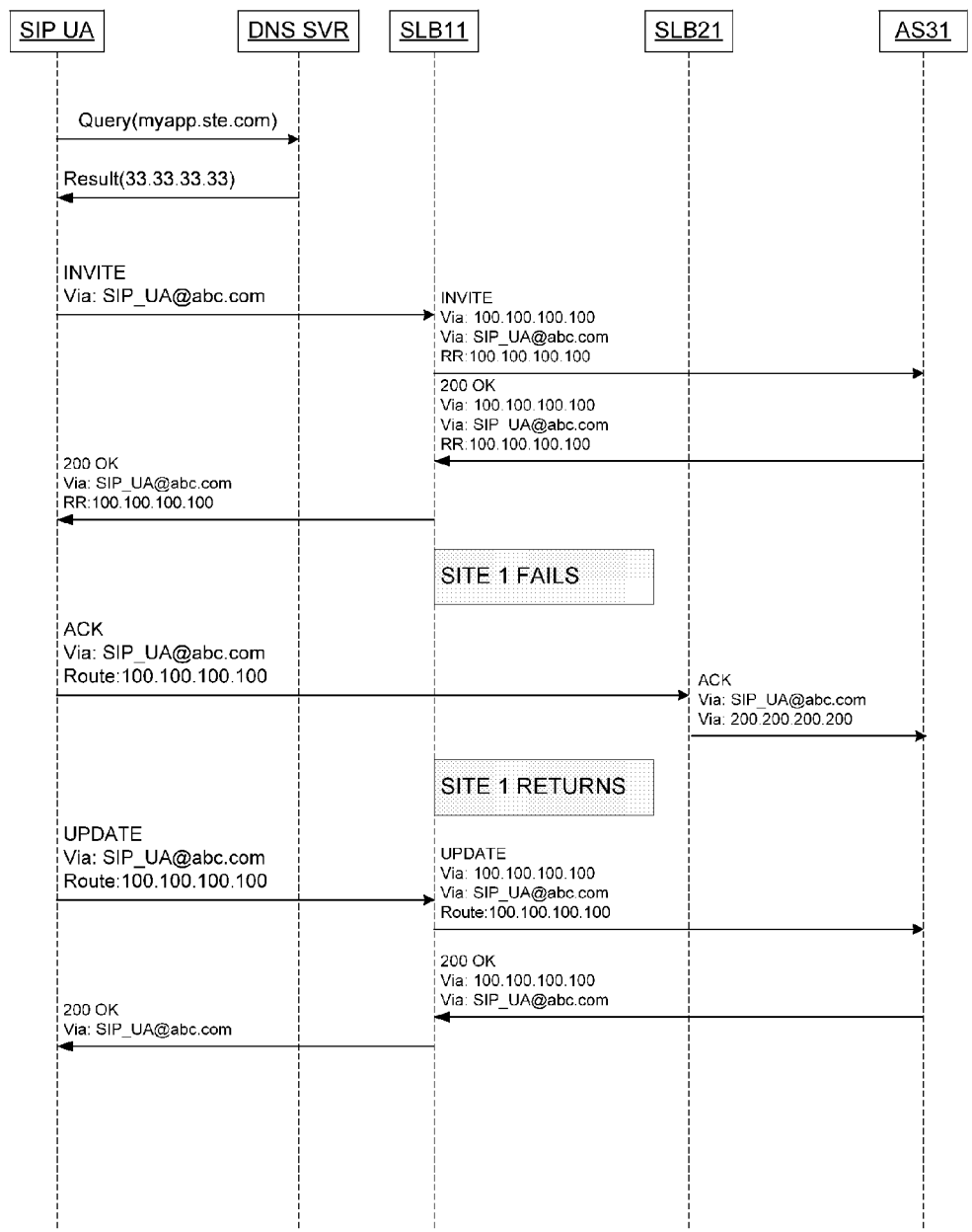
FIG. 5: shows an example of a site failure with an existing dialogue scenario.

FIG. 5 shows an example of a site failure with an existing dialogue scenario and is based on the setup in FIG. 4. FIG. 4 is similar to FIG. 1 except that all the servers reside on a separate third site (Site 3). Thus Site 3 includes App Server-31 and App Server-32. The BGP Router configurations again can be Active-Active or Active-Backup. The example in FIG. 5 assumes that the servers at the third site do not fail, and that both SLB sites, Site 1 and Site 2 are configured to manage the same set of servers residing at Site 3. It further assumes an active-backup configuration for sites 1 and 2.

With reference to FIGS. 4 and 5, when Site 1 fails, new requests for existing dialogues on Site 1 will be routed to Site 2 since the Site 1 VIP is an anycast address, and this is the address that is inserted into the Record-Route during call initiation. When Site-1 returns, requests for that dialogue are routed back to Site-1.

Note: If the servers reside on the same site as the SLBs, it may be desired that existing dialogues be dropped by Site 2, since it cannot continue to route the requests to the same server which initially handled the dialogue. If so, a rule can be added (to Site 2's SLB) which specifies that requests with the Route header containing the Site 1 VIP as the value be dropped or be replied with an error response. Alternatively, the Site VIPs can be configured as regular IP addresses as opposed to anycast addresses.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

Most preferably, the principles of the present invention are implemented as a combination of hardware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

It is to be further understood that, because some of the constituent system components and methods depicted in the accompanying drawings may be implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regards any means that can provide those functionalities as equivalent to those shown herein.

What is claimed is:

1. A method for performing a distribution of SIP requests among SIP servers deployed in at least two geographically distributed sites with a load balancer in each site, the method comprising:

assigning a first load balancer in a first site with a first site address and a global address and a second load balancer in a second site with a second site address and the global address, wherein each of the first site address and the second site address is a unique address to each respective site;

receiving SIP requests by the first load balancer in the first site, wherein the first load balancer acts as an active load balancer;

determining whether a failure occurs in the first site;

adding, to a VIA header of each SIP request to be redirected, a parameter indicating the first load balancer performs a redirection; and redirecting, upon a failure in the first site, SIP requests directed to the global address to the second load balancer in the second site, wherein the second load balancer acts as a backup load balancer.

2. The method of claim 1, further comprising:
adding the second site address of the second site to the VIA header and a record-route header of each SIP request redirected to the second load balancer.

3. The method of claim 1, further comprising:
receiving the redirected SIP requests at the second load balancer;
adding the second site address of the second load balancer to the VIA header and a record-route header of each of the redirected SIP requests; and
sending the SIP requests to one of one or more servers under control of the second load balancer.

4. The method of claim 3, further comprising:
determining, by the second load balancer, if the received SIP requests were previously redirected based on a value of the parameter included in the VIA header; and
load balancing the SIP request amongst servers controlled by the second load balancer, if the SIP requests were previously redirected.

5. The method of claim 1, further comprising:
determining whether the SIP requests need to be redirected from the first site to the second site based on optimization criteria, wherein the optimization criteria includes at least a proximity to a SIP endpoint.

6. The method of claim 5, wherein upon determining whether the SIP request needs to be redirected, further comprising:
adding the first site address of the first site to the VIA header of the SIP request received on the global address.

7. The method of claim 6, wherein upon determining whether the SIP request should be redirected over the same transport protocol the first site address of the first site is not added to a record-route header of the SIP request.

8. The method of claim 6, wherein upon determining whether the SIP request should be redirected over a different transport protocol, further comprising:
adding the first site address of the first site to a record-route header of the SIP request.

9. The method of claim 5, further comprising:
determining the proximity to said SIP endpoint, said SIP endpoint is any one of a calling party of a SIP transaction and a called party of a SIP transaction.

10. The method of claim 9, wherein the proximity to the SIP endpoint is measured in any combination of the number of SIP hops separating between at least one of said load balancers and said SIP endpoint, the number of SIP hops separating between at least one of said load balancers and the proxy serving the domain of said SIP endpoint, the number of IP hops separating between at least one of said load balancers and said SIP endpoint, and the number of IP hops separating between at least one of said load balancers and a proxy serving the domain of said SIP endpoint.

11. The method of claim 5, further comprising:
sharing, by said second load balancer, the proximity information with said first load balancer.

12. The method of claim 1, wherein the global address is an Anycast Internet protocol (IP) address.

13. The method of claim 12, wherein one of said first or second sites publishes the global Anycast IP address with a lower cost than the other site.

14. The method of claim 13, wherein the site IP addresses are Anycast addresses and each site IP address is supported by the other site.

15. The method of claim 13, wherein each site load balancer publishes its own site IP address with a lower cost and all other site IP addresses with a higher cost.

16. The method of claim 1, wherein either of the first or second load balancer receives initial SIP requests directed to a Domain Name and each load balancer is configured to load balance requests directed to the Domain Name.

17. The method of claim 16, wherein each site is defined by a Global Domain Name, wherein each Global Domain Name resolves to an address of a respective site based on a priority of the site and a proximity of the site to the SIP endpoints.

18. The method of claim 17, wherein each site is defined by a respective unique Domain Name, wherein each unique Domain Name resolves to an address of a respective site or an address of another site based on a priority of the site and a proximity of the site to the SIP endpoints.

19. A method for distributing SIP requests between at least two load balancers deployed in at least two geographically distributed sites, comprising:
assigning a first load balancer in a first site with a first Virtual IP (VIP) address and a unique first site address;
assigning a second load balancer in a second site with the a second VIP address and a unique second site address;
providing the first site with the first load balancer configured to balance load requests directed to the VIP address;
providing the second site with the second load balancer configured to balance load requests directed to the VIP address;
receiving a SIP request directed to the first VIP address or the second VIP address when the first and second load balancers operate in an active-active mode;
determining if the SIP request needs to be redirected to the first site or the second site, upon occurrence of a failure in the site where said SIP request is received; and
upon determining the SIP request should be redirected, adding, to a VIA header of the SIP request to be redirected, a parameter indicating the SIP request being redirected by one of the first and second load balancers; and
redirecting the SIP request to the determined site.

20. The method of claim 19, wherein the VIP address is an Anycast IP address and each load balancer is configured to load balance requests directed to the Anycast IP address.

21. The method of claim 20, wherein one of said first or second load balancers publishes the VIP address with a lower cost than the other load balancer.

22. The method of claim 20, wherein said first and second load balancers publishes the VIP address with an equal cost.

23. The method of claim 19, wherein the first and second VIP addresses are Anycast addresses, wherein the first VIP address is supported by the first site and the second VIP address is supported by the second site.

24. The method of claim 23, wherein the first load balancer publishes the first VIP address at a lower cost than other VIP addresses and the second load balancer publishes the second VIP address with a lower cost than other VIP addresses.

25. The method of claim 19, further comprising:
upon determining the VIP request should be redirected to the first site, adding the first VIP address to the VIA header and a record route header of the SIP request, wherein the first VIP address is added by the first load balancer; and
upon determining the VIP request should be redirected to the second site, adding the second VIP address to the VIA header and a record route header of the SIP request, wherein the second VIP address is added by the second load balancer.

26. The method of claim 19, further comprises:
adding, by a load balancer redirecting the SIP request, a site address of the load balancer to a VIA header of the SIP request, wherein the site address is not added to a record-route header of the SIP request.

27. The method of claim 19, wherein determining if the SIP request needs to be redirected is based on a comparison of predetermined criteria associated with a load balancer receiving the SIP request and load balancers to which the SIP request is redirected to, wherein the predetermined criteria includes at least a proximity to a SIP endpoint.

28. The method of claim 27, wherein at least one of said load balancers periodically updates at least one other of said load balancers with the predetermined criteria associated with the load balancer, wherein the predetermined criteria includes at least the proximity to a SIP endpoint.

29. The method of claim 28, wherein the SIP endpoint is any one of a calling party of a SIP transaction and a called party of a SIP transaction.

30. A system for load balancing SIP requests, comprising:
a first load balancer for distributing SIP requests amongst SIP application servers, wherein the first load balancer is deployed in a first site, wherein said first load balancer is an active SIP Proxy;
a second load balancer providing a redundancy and also capable of distributing SIP requests amongst SIP application servers, wherein the second load balancer is deployed in a second site, said second load balancer is a backup SIP Proxy and wherein the first site and the second site are geographically distributed; and
a redirecting unit for redirecting SIP requests to the first load balancer when the first load balancer is active and redirecting SIP requests to the second load balancer when the first load balancer fails, wherein the first load balancer is configured with a unique address of the first site and a global Anycast address and the second load balancer is configured with a unique address of the second site and a global Anycast address, wherein the redirection of SIP requests is based, in part, on a proximity of one of the first and second load balancers to a SIP endpoint;
a processor for controlling the first load balancer, the second load balancer and the redirecting unit.

31. The system of claim 30, wherein the first load balancer and the second load balancer load balance requests directed to the global Anycast address.

32. A method for distributing SIP requests between at least two load balancers, comprising:
providing a first site with a first load balancer configured to load balance SIP requests directed to a Global Domain Name, wherein the first load balancer is an active load balancer;

providing a second site with a second load balancer configured to load balance SIP requests directed to the Global Domain Name, wherein the second load balancer is a backup load balancer, wherein the first load balancer and the second load balancer are configured with a unique Domain Name of each respectively;

receiving SIP requests directed to the Global Domain Name at one of the first site and the second site;

load balancing by the first load balancer SIP requests directed to the Global Domain Name if the first site is active; and load balancing by the second load balancer SIP requests directed to the Domain Name if the first site fails.

* * * * *